H. B. Hale,
Teeth Fastening.
No. 108,588.   Patented Oct. 25, 1870.
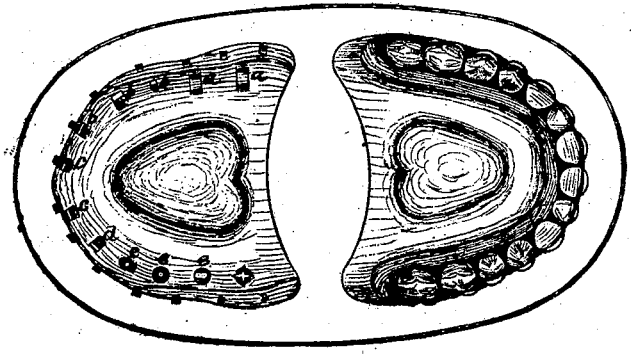
Reference.
a.a. loops.
b.b.b. hooks.
c.c. dove-tails.
d. eyelet.
e.e.e. countersink raised.
Heman B. Hale,
Inventor.
Witnesses.
Richard T. Crawford
William Marshall

United States Patent Office.

HEMAN B. HALE, OF ROCKFORD, ILLINOIS.

Letters Patent No. 108,588, dated October 25, 1870; antedated October 21, 1870.

IMPROVEMENT IN FASTENING ARTIFICIAL TEETH TO METALLIC PLATES.

The Schedule referred to in these Letters Patent and making part of the same.

*To all whom it may concern:*

Be it known that I, HEMAN B. HALE, of the city of Rockford, and county of Winnebago and State of Illinois, have invented an Improved Method of Fastening Artificial Teeth to Metallic Dental-Plates; and I do hereby declare the following to be a full and clear description of the same, sufficient to enable those skilled in the art to which the invention appertains to make use of it.

In attaching teeth to gold, silver, and platina plates by means of vulcanite or other combining material, it is common to solder metallic attachments of suitable forms to the plates in appropriate places to hold the teeth, and combining material securely to the plates. This involves the expenditure of much time and labor, and is more or less expensive pecuniarily.

In attempts to use aluminum plates in like manner, an obstacle has been encountered in the want of a solder that could be used with facility with that metal.

A device to meet the difficulties just mentioned has been used to a limited extent, which consists in cutting through the plates upon the lingual side of the teeth, and raising partially-detached portions in the form of lips, and then bending the lips into the form of hooks.

My improvement consists, first, in cutting and forming the lips mentioned into shapes that will hold more securely in the combining material. By punching through the lip an eyelet is formed; by cutting on one side of the lip, a single hook; by cutting both sides, a double hook or dovetail; or the lip may be formed into the shape of a head. These forms are but variations of one principle, that is, making the projections smaller at their bases than at their ends. Thus formed they will interlock with the combining material more securely than the bent form, and are not liable to be straightened, loosened, or drawn out.

Another advantage in this method of forming the fastenings is that they can be placed in close proximity to the pins of the teeth, which will enable any one to avoid using so much of the combining material as would be cumbersome in the mouth, restrict the movements of the tongue, and interfere with the speech of the wearer.

Another part of my invention consists in the application and use of attachments about the borders of dental-plates near the margin of the gums. These attachments are made by cutting through and projecting partially-detached portions of the plates, and forming the projections into dovetails or other suitable shapes, or by the use of suitably-formed perforations of the plates.

These border attachments are for the purpose of enabling the operator to secure the teeth, and combining material more firmly to the plate, and avoid undue thickness and prominence, while he secures sufficient strength and stability and a well-finished border.

An idea of this invention may be gained from the accompanying drawing.

The fastening points being completed, the teeth are arranged upon the plate, and wax molded about the teeth and gums in like manner as for vulcanite work. A mold of the case is then made, like those used for vulcanizing or casting, and the denture is completed by the various manipulations and processes known to dentists.

The material used for combining teeth with plates having this invention applied may be vulcanite or other suitable substance, and must be used in a softened, plastic, fluid, or melted condition, completely enveloping the fastening points, filling the perforations, and occupying all the space about the teeth and gums necessary to produce an impermeable, finished, artistic denture.

Having thus described my invention,

What I claim as new, and desire to secure by Letters Patent, is—

1. The improved form of attachments for securing teeth to dental-plates with a suitable combining material, by making the projections from the plate about the lingual side of the teeth smaller at their bases than at their ends, as described.

2. In combination with the fastenings about the lingual side of the teeth, the application of attachments about the borders of dental-plates, substantially as described, for the purposes mentioned.

HEMAN B. HALE.

Witnesses:
WILLIAM MARSHALL,
CHARLES WORKS.